United States Patent [19]

Honda

[11] Patent Number: 5,659,196
[45] Date of Patent: Aug. 19, 1997

[54] INTEGRATED CIRCUIT DEVICE FOR ACCELERATION DETECTION

[75] Inventor: Ziro Honda, Tokyo, Japan

[73] Assignee: Mitsubishi Denki Kabushiki Kaisha, Tokyo, Japan

[21] Appl. No.: 633,694

[22] Filed: Apr. 19, 1996

[30] Foreign Application Priority Data

Nov. 8, 1995 [JP] Japan .................. 7-289817

[51] Int. Cl.⁶ .................. H01L 29/82
[52] U.S. Cl. .................. 257/415; 257/417; 257/419
[58] Field of Search .................. 257/414, 415, 257/417, 420, 419; 437/180

[56] References Cited

U.S. PATENT DOCUMENTS

| | | | |
|---|---|---|---|
| 3,186,237 | 6/1965 | Forrest | 257/417 |
| 3,312,790 | 4/1967 | Sikorski | 247/417 |
| 3,437,849 | 4/1969 | Treatch et al. | 257/417 |
| 4,069,094 | 1/1978 | Shaw et al. | |
| 4,990,986 | 2/1991 | Murakami et al. | 257/419 |
| 5,194,402 | 3/1993 | Ehrfeld et al. | 257/415 |
| 5,231,879 | 8/1993 | Yamamoto | 257/415 |
| 5,260,596 | 11/1993 | Dunn et al. | 257/415 |
| 5,504,356 | 4/1996 | Takeuchi | 257/415 |

FOREIGN PATENT DOCUMENTS

| | | | |
|---|---|---|---|
| 4206778 | 7/1992 | Japan | 257/414 |
| 5007006 | 1/1993 | Japan | 257/415 |

*Primary Examiner*—Sara W. Crane
*Assistant Examiner*—Phat X. Cao
*Attorney, Agent, or Firm*—Oblon, Spivak, McClelland, Maier & Neustadt, P.C.

[57] ABSTRACT

An integrated circuit device for acceleration detection (100) includes a thick substrate (1) and a semiconductor strain sensor (2) provided on the thick substrate (1) with conductive solder bump electrodes (8) interposed therebetween. The semiconductor strain sensor (2) has a mass holding part (2b), an acceleration sensing part (2a) provided with a piezoresistance layer, a base end part (2c) fixed on the solder bump electrode (8) and a balance keeping part (2d). Electric signals obtained from the semiconductor strain sensor (2) are connected to pattern wiring lines (7) which are provided on the thick substrate (1) by means of the solder bump electrode (8) interposed therebetween. A space (W) between the thick substrate (1) and the mass holding part (2b) depends upon the solder bump electrode (8). When an acceleration is applied to the integrated circuit device for acceleration detection (100) having the above constitution, the acceleration sensing part (2a) and a mass holding part (2b), and the balance keeping part (2d) vibrate unbalancedly in the respective natural vibration modes which are different from one another above the solder bump electrode (8), affecting one another. Thus, the integrated circuit device for acceleration detection (100) which achieves high yield and quality is provided.

7 Claims, 6 Drawing Sheets

5,659,196

INTEGRATED CIRCUIT DEVICE FOR ACCELERATION DETECTION

BACKGROUND OF THE INVENTION

1. Field of the Invention

The present invention relates to an integrated circuit device for acceleration detection which is equipped with a semiconductor strain sensor for transducing the acceleration of vibration and the like in terms of the quantity of strain into electricity.

2. Description of the Background Art

FIGS. 14 and 15 are a sectional view and a plan view showing an integrated circuit device for acceleration detection in the background art, respectively.

The integrated circuit device for acceleration detection 200 includes a semiconductor strain sensor 20 provided on a thick substrate 1 with an intermediate pedestal 3 which is extremely thin interposed therebetween. The semiconductor strain sensor 20 has an acceleration sensing part 2a, a mass holding part 2b and a base end part 2c. The acceleration sensing part 2a is thin so as to ensure flexibility, and connects the mass holding part 2b to the base end part 2c. The base end part 2c is fixed on the intermediate pedestal 3. A surface of the acceleration sensing part 2a which is not opposed to the thick substrate 1 is provided with a sensor for determining the quantity of flexure (not shown), e.g., a piezoresistance layer for transducing the acceleration in terms of variation in resistance value due to the flexure into electricity. With such a mechanism, the semiconductor strain sensor 20 transduces the acceleration into an electric signal. The thick substrate 1, the semiconductor strain sensor 20 and the intermediate pedestal 3 are fixed to one another with die bonding adhesives 4. A surface of the base end 2c which is not opposed to the thick substrate 1 is provided with electrode pads 5, from which gold wires 6 are drawn. Each gold wire 6 is connected to each pattern wiring line 7 provided on the thick substrate 1. The electric signal obtained from the piezoresistance layer is propagated through the electrode pad 5, the gold wire 6 and the pattern wiring line 7, and electrically processed. When the acceleration is not applied, a space W between the mass holding part 2b and the thick substrate 1 depends upon the thickness of the intermediated pedestal 3 and that of the die bonding adhesive 4.

Discussion on the principle for sensing the acceleration will be now presented. When the acceleration is applied to the integrated circuit device for acceleration detection 200, an inertial force acts on the mass holding part 2b. The acceleration sensing part 2a, which is thin and flexible, is thereby bent and the property of the piezoresistance layer is changed. Since the flexure in the acceleration sensing part 2a becomes larger with an increase in acceleration applied thereto, detection of the acceleration using the piezoresistance layer can be made. The change in property of the piezoresistance layer is transduced into an electric signal through a signal processing for converting the acceleration into a voltage.

An acceleration applied under an ordinary measurement, of several tens to several hundreds G, does not break the acceleration sensing part 2a, and can be detected. Under a drop and impact test, however, an acceleration of several tens of thousands G is applied to and sometimes breaks the thin acceleration sensing part 2a.

To prevent the breakage of the acceleration sensing part 2a, in the background art, the mass holding part 2b collides against the thick substrate 1 under a drop impact, and the impact on the semiconductor strain sensor 20 is absorbed and relieved by a mechanical damping effect. The occurrence of collision of the mass holding part 2b against the thick substrate 1 depends upon the space W.

In the background-art integrated circuit device for acceleration detection 200 having the above constitution has a great difficulty in ensuring a precisely uniform thickness of the die bonding adhesive 4. Specifically, in an ordinary case, variation of several tens μm arises in the space W of 250 μm. Thus, the background-art integrated circuit device for acceleration detection 200 has a disadvantage that the difficulty in precisely controlling the space W and wide variation of the space W arisen during the mounting process causes deterioration of yield and quality of products.

SUMMARY OF THE INVENTION

The present invention is directed to an integrated circuit device for acceleration detection. According to a first aspect of the present invention, the integrated circuit device for acceleration detection comprises a substrate; at least one supporting pedestal formed on the substrate; and detecting means mounted on the substrate with the supporting pedestal interposed therebetween, having an acceleration detecting portion, wherein the detecting means includes first, second, third and fourth portions ranged in this order, the second portion is thinner than the first, third and fourth portions, the third portion is fixed on the supporting pedestal, and the fourth portion is balanced with the first and second portions.

According to a second aspect of the present invention, the supporting pedestal is conductive.

According to a third aspect of the present invention, the supporting pedestal includes solder.

According to a fourth aspect of the invention, a space between the substrate and the first portion of the detecting means depends upon the amount of the solder and the number of the supporting pedestals.

In the integrated circuit device for acceleration detection in accordance with the first aspect of the present invention, the fourth portion of the detecting means extends from the supporting pedestal in the opposite sense to a sense in which the first and second portions extend therefrom, and is thereby balanced with the first and second portions. When an acceleration is applied, the first and second portions, and the fourth portion accordingly vibrate in the respective modes different from one another, and the range of frequency applied to the detecting means shrinks. As a result, it is possible to avoid application of a natural resonance frequency to the acceleration detecting portion of the detecting means.

In the integrated circuit device for acceleration detection in accordance with the second aspect of the present invention, provision of the supporting pedestal which is conductive eliminates the need for wires and the like to connect an electric signal obtained from the detecting means. Therefore, some steps of the manufacturing process can be omitted and the manufacturing cost is reduced. Thus, the integrated circuit device for acceleration detection of the present invention can be provided at a low cost.

In the integrated circuit device for acceleration detection in accordance with the third aspect of the present invention, the supporting pedestal is formed, determining the space between the substrate and the first portion of the detecting means depending upon the solder fused by heating. The space to be determined is not affected by the thickness of the solder before being fused, but depends upon only the amount of solder. Furthermore, solder is easily available in commercial terms. For these reasons, the integrated circuit device for acceleration detection of the present invention can be easily manufactured.

In the integrated circuit device for acceleration detection in accordance with the fourth aspect of the present invention, the space between the substrate and the first portion of the detecting means depends upon the amount of solder to be provided and the number of supporting pedestals to be placed. Only changing the amount of solder and the number of supporting pedestals, instead of preparing supporting pedestals of different height in advance, can respond to variation of the spaces, thereby achieving various spaces. Such simplification of manufacturing process allows reduction in manufacturing cost, and therefore the integrated circuit device for acceleration detection of the present invention can be provided at a low cost.

An object of the present invention is to provide an integrated circuit device for acceleration detection which achieves an easy and steady control of the space W and an enhancement in yield and quality of products.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
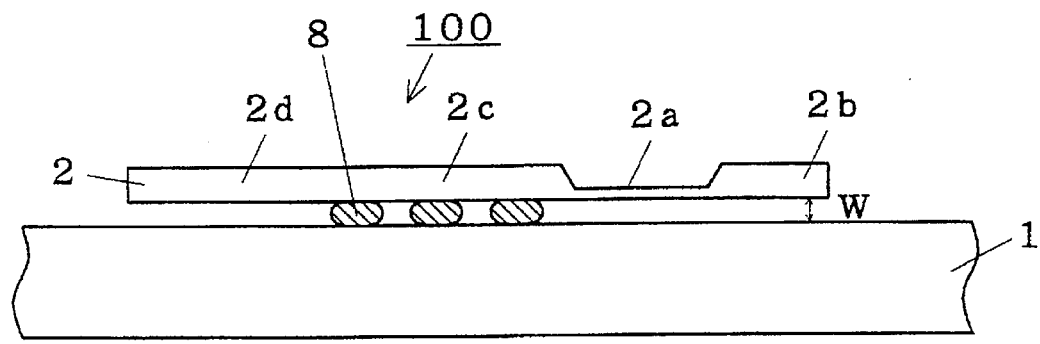
FIG. 1 is a sectional view of an integrated circuit device for acceleration detection in accordance with a preferred embodiment of the present invention.
Figure 2:
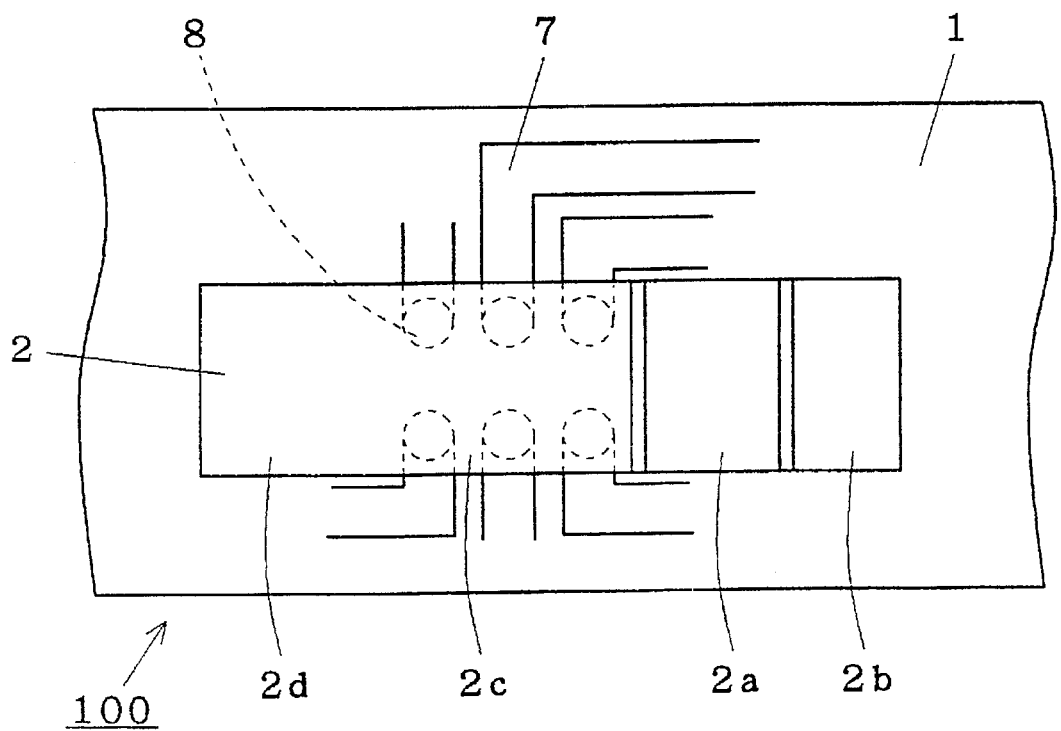
FIG. 2 is a plan view of the integrated circuit device for acceleration detection shown in FIG. 1.

FIGS. 1 and 2 are a sectional view and a plan view of an integrated circuit device for acceleration detection 100, respectively, in accordance with a preferred embodiment of the present invention. Like elements are given the same reference characters as the background art, and discussion thereof will be omitted.

The integrated circuit device for acceleration detection 100 includes a semiconductor strain sensor 2 mounted by a flip chip method on the thick substrate 1 with a conductive solder bump electrode 8 interposed therebetween. The thick substrate 1 is made of Si, and may be made of $Al_2O_3$ which has a higher impact absorbing effect than Si by the mechanical damping because of its more softness. The semiconductor strain sensor 2 has the mass holding part 2b, the acceleration sensing part 2a, the base end part 2c and a balance keeping part 2d, and the base end part 2c is fixed on solder bump electrodes 8. A surface of the acceleration sensing part 2a which is opposed to the thick substrate 1 is provided with the piezoresistance layers. An electric signal obtained from the semiconductor strain sensor 2 is propagated to the pattern wiring line 7 which is provided on the thick substrate 1 through the solder bump electrodes 8. The space W depends upon the solder bump electrodes 8. Since the solder bump electrode 8 supporting the semiconductor strain sensor 2 establishes an electric connection, the electrode pad 5 and the gold wire 6, which would be required in the background art, are not needed, thereby simplifying a manufacturing process. The solder bump electrode 8 may be replaced by a conductive rubber and the like, as far as the electric connection is concerned.

Figure 3:
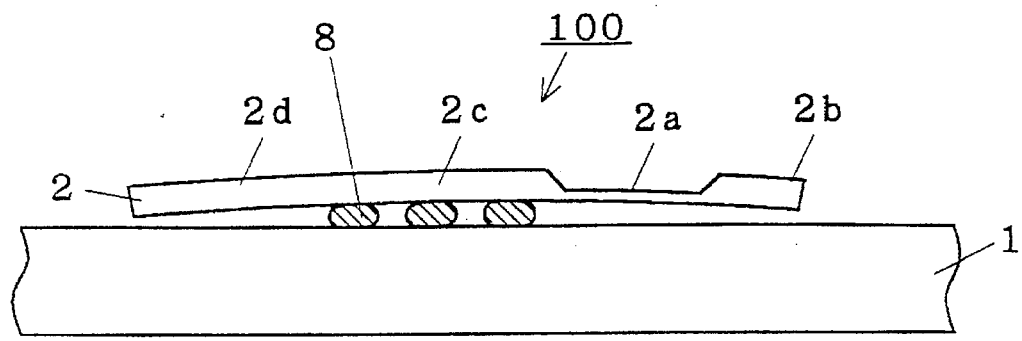
FIG. 3 is a sectional view showing an example of a vibration of the integrated circuit device for acceleration detection of FIGS. 1 and 2 when an acceleration is applied.
Figure 4:
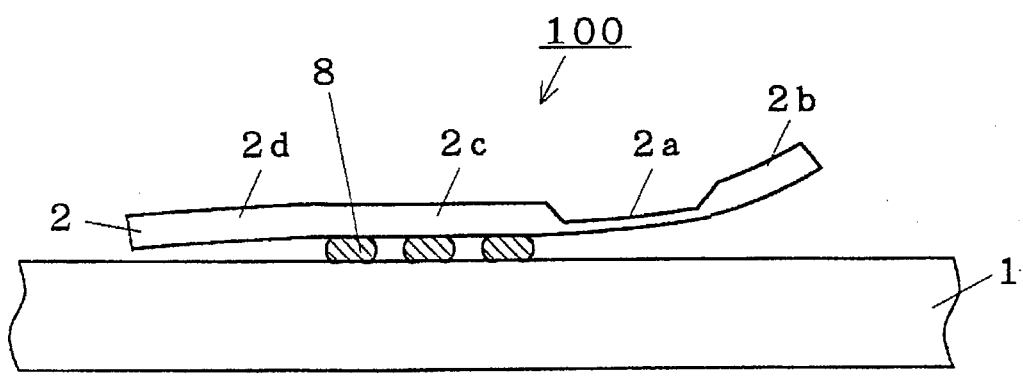
FIG. 4 is a sectional view showing another example of a vibration of the integrated circuit device for acceleration detection of FIGS. 1 and 2 when the acceleration is applied.

When an acceleration is applied to the integrated circuit device for acceleration detection 100, the acceleration sensing part 2a and the mass holding part 2b, and the balance keeping part 2d vibrate in the respective natural vibration modes. FIGS. 3 and 4 illustrate the vibration. In some cases, the acceleration sensing part 2a and the mass holding part 2b, and the balance keeping part 2d warp in the same direction (so as to approach the thick substrate 1 as shown in FIG. 3), and in other cases, warp in opposite direction (so that the acceleration sensing part 2a and the mass holding part 2b may go away from the thick substrate 1 and the balance keeping part 2d may approach the thick substrate 1 as shown in FIG. 4). The various shapes of the semiconductor strain sensor 2 described above is induced by the different vibration modes between the acceleration sensing part 2a and the mass holding part 2b, and the balance keeping part 2d. The acceleration sensing part 2a and the mass holding part 2b, and the balance keeping part 2d vibrate, affecting each other, like interlocked pendulums which exchange energy with each other. Utilizing that, it is possible to protect the piezoresistance layer from breakage.

Figure 5:
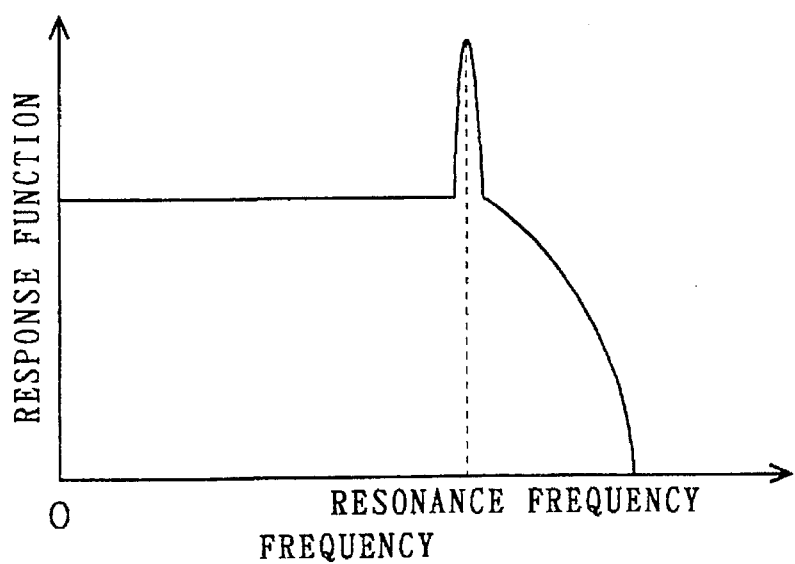
FIG. 5 is a graph of response function of a semiconductor strain sensor having no mass holding part.

The piezoresistance layer is broken at a resonance frequency ranging from about 7 to 12 kHz. Under the drop test from a height of 1 m to a concrete plane, the frequency spectrum of external force applied to a complete armored epizoresistance layer ranges from 0 to 20 kHz which includes the resonance frequency at which the piezoresistance layer is broken. Application of the external force having that frequency spectrum of 0 to 20 kHz raises the possibility of breaking the piezoresistance layer. FIG. 5 is a graph showing a response function (decibel) of the piezoresistance layer when the external force having that frequency spectrum is applied thereto without being absorbed. In this graph, the horizontal axis is the frequency applied to the piezoresistance layer under the drop and impact test and the vertical axis is the response function of the piezoresistance layer to the applied frequency.

Figure 6:
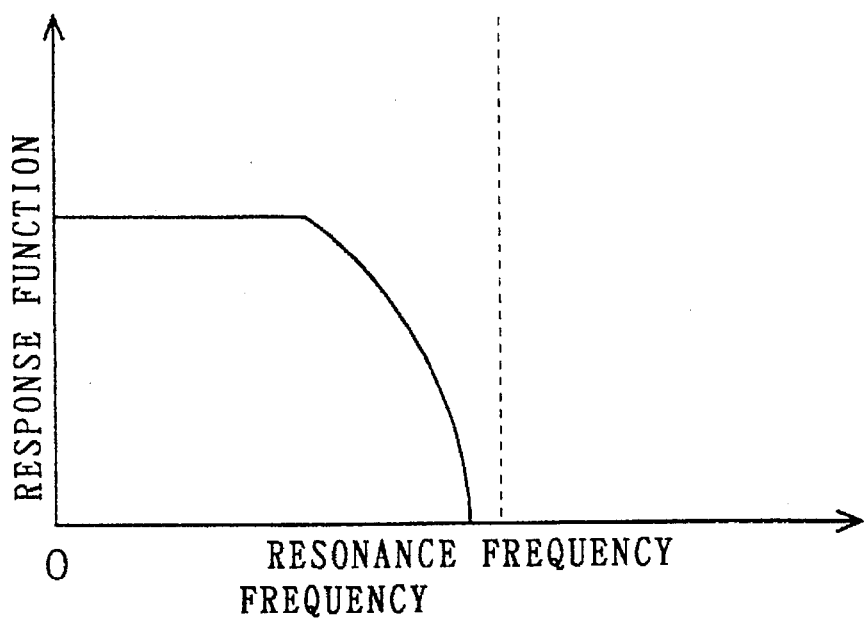
FIG. 6 is a graph of response function of a semiconductor strain sensor having a mass holding part.

As discussed above, part of the semiconductor strain sensor 2 consisting of the acceleration sensing part 2a and the mass holding part 2b and including a thin portion, and the balance keeping part 2d having uniform thickness vibrates unbalancedly in the respective normal vibration modes which are different from one another above the solder bump electrodes 8, thereby absorbing a stress generated about a portion above the solder bump electrodes 8. As a result, the range of the frequency spectrum of the external force applied to the piezoresistance layer shrinks, as shown in FIG. 6. Accordingly, provision of the balance keeping part 2d avoids a resonance point, and the drop test can be carried out without consideration of the breakage due to resonance. Therefore, wide application of the integrated circuit device for acceleration detection 100 is available.

Furthermore, the integrated circuit device for acceleration detection 200 in the background art has an only advantage of achieving the mechanical damping effect by the thick substrate 1 and the mass holding part 2b, but has a disadvantage that stress is likely to concentrate on both sides of the acceleration sensing part 2a. Provision of the balance keeping part 2d in the present invention allows absorption of the stress on a portion around the solder bump electrodes 8 from both sides, and accordingly an effect of moderation the stress is achieved as well as the mechanical damping effect. Therefore, the possibility of breakage of the semiconductor strain sensor 2 is further reduced.

Referring next to FIGS. 7 to 12, a method of mounting the integrated circuit device for acceleration detection 100 will be discussed.

Figure 7:
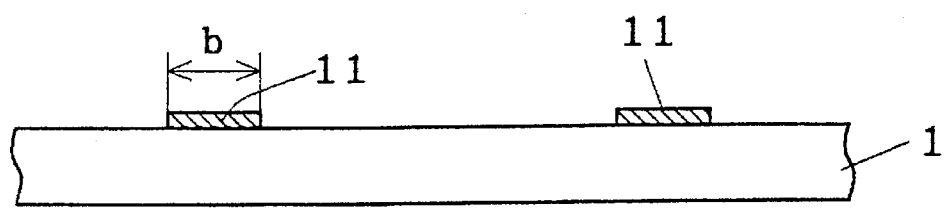
FIGS. 7 to 12 are sectional views illustrating a process of manufacturing the integrated circuit device for acceleration detection in accordance with the present invention step by step.
Figure 8:
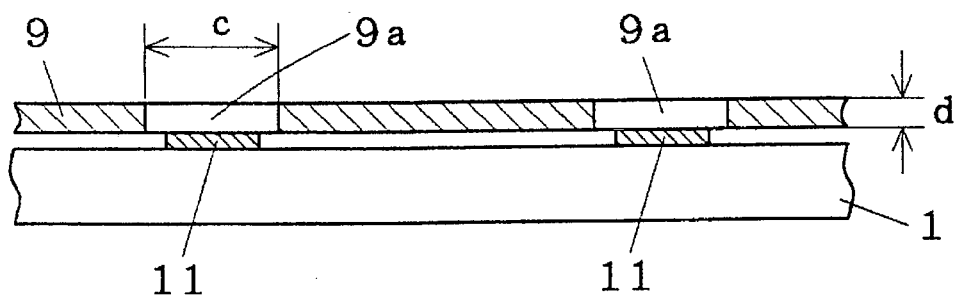
Figure 9:
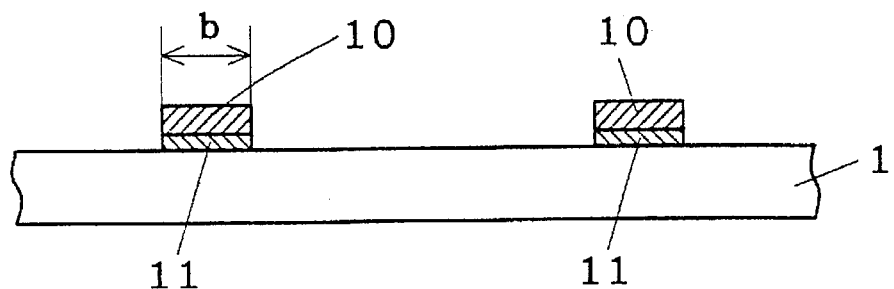
Figure 10:
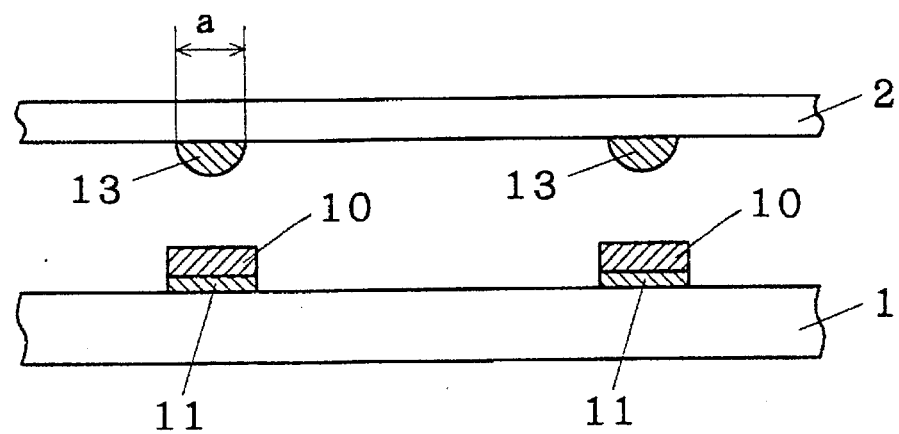
Figure 11:
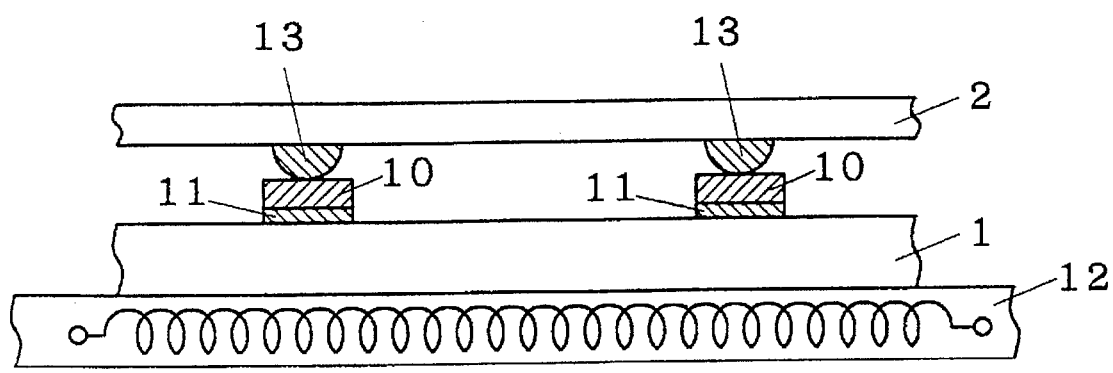
Figure 12:
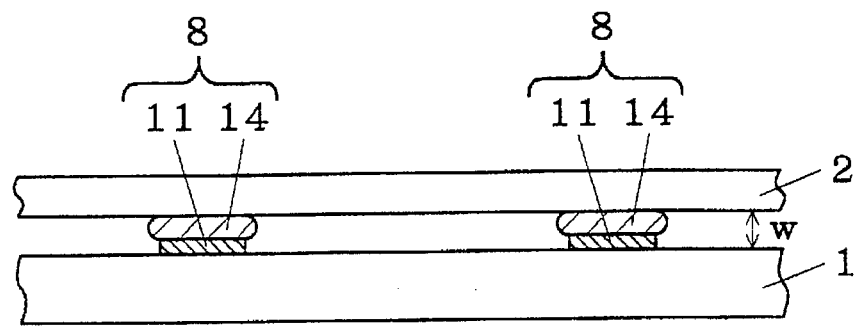

The thick substrate 1 equipped with thick substrate bump electrodes 11 having a diameter b is prepared (shown in FIG. 7). Thick substrate print solders 10 are solder-printed respectively on the thick substrate bump electrodes 11 by using a metal mask 9, the thickness of which is d, and which has openings 9a having a diameter c. A relation between the diameter c of the openings 9a and the diameter b of the thick substrate bump electrodes 11 is determined c>b so that both diameters of the thick substrate print solders 10 and the thick substrate bump electrodes 11 may become equal as the result of contraction of the thick substrate print solders 10 when cooled. In the same manner, dome-shaped bump solders 13 having a diameter a are provided on the semiconductor strain sensor 2 so as to adjust themselves respectively to the thick substrate bump electrodes 11 and the thick substrate print solders 10 (shown in FIG. 10). Then, the semiconductor strain sensor 2 is placed on the thick substrate 1 as shown in FIG. 11, and laid on a heating board 12 to fuse each thick substrate print solder 10 and each bump solder 13, thereby forming a connecting solder 14 (shown in FIG. 12). At this time, the semiconductor strain sensor 2 and the thick substrate 1 are self-aligned by a surface tension of the fused connecting solders 14. The background-art configuration where the semiconductor strain sensor 2 consists only of the acceleration sensing part 2a, the mass holding part 2b and the base end part 2c needs means for holding the semiconductor strain sensor 2 when the solder is fused. Since the balance keeping part 2d, and the acceleration sensing part 2a and the mass holding part 2b are well balanced, it is not necessary to hold the semiconductor strain sensor 2 with another holding means when the thick substrate print solders 10 and the bump solders 13 are fused by the heating board 12. The space W depends upon the number, the amount and the surface tension of thick substrate print solders 10 and bump solders 13. Solder of consistent quality always provides an uniform surface tension. Accordingly, using solder of consistent quality allows the space W to be uniquely determined with respect to a certain number and a certain amount of the thick substrate print solders 10 and bump solders 13. Obtaining always a precise space W, the integrated circuit device for acceleration detection 100 with a stable drop strength, higher yield and better quality can be provided. The thick substrate bump electrode 11 and the connecting solder 14 constitute the solder bump electrode 8.

Figure 13:
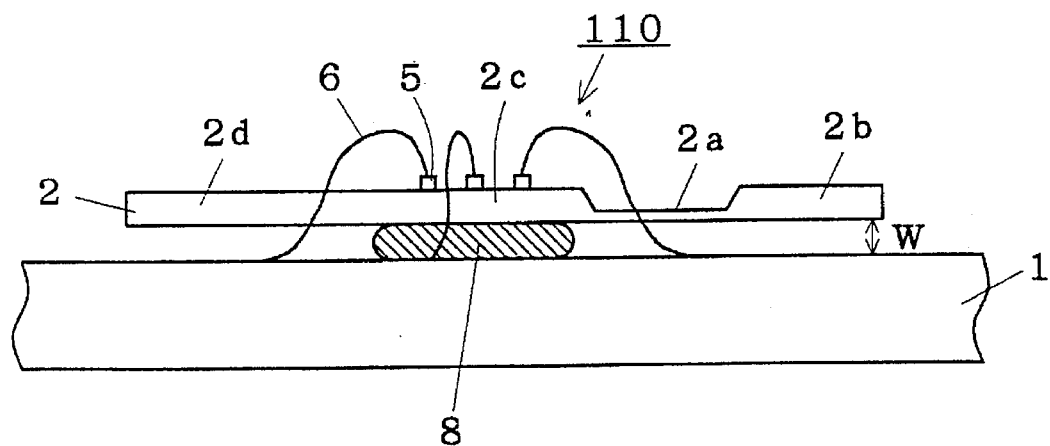
FIG. 13 is a sectional view of the integrated circuit device for acceleration detection having a single solder bump electrode.
Figure 14:
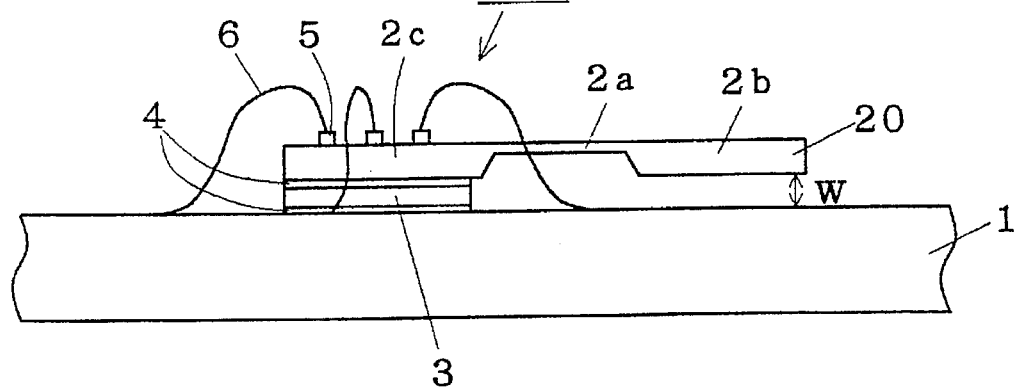
FIG. 14 is a sectional view of an integrated circuit device for acceleration detection in the background art.
Figure 15:
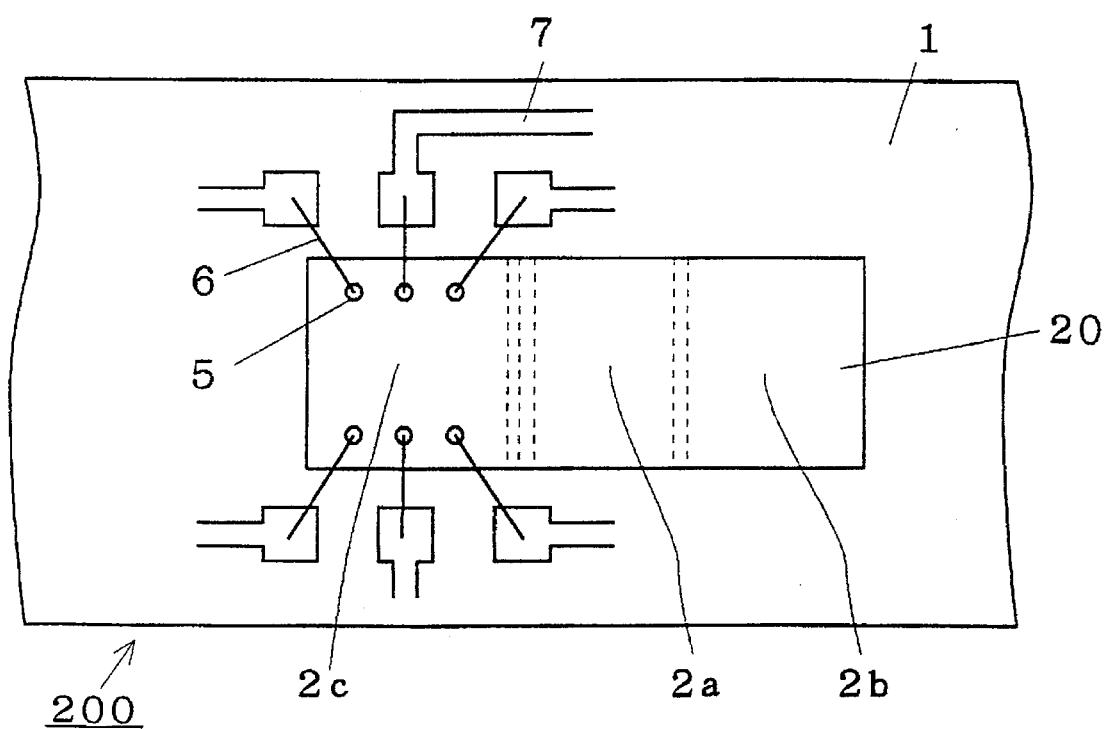
FIG. 15 is a plan view of the integrated circuit device for acceleration detection shown in FIG. 14.

When only one solder bump electrode 8 is provided, the space W can be also uniquely determined with respect to a certain amount of solder. In this case, the electrode pad 5 and the gold wire 6 are needed to connect a plurality of electric signals from the piezoresistance layer to the respective pattern wiring lines 7. FIG. 13 shows an integrated circuit device for acceleration detection 110 which is provided with a single solder bump electrode 8. When a plurality of solder bump electrodes 8 are provided as shown in FIGS. 1 and 2, a plurality of electric signals from the piezoresistance layer can be connected to the respective pattern wiring lines 7 with the plurality of solder bump electrodes 8. The integrated circuit device for acceleration detection 100 of the present invention achieves another effect that the semiconductor strain sensor 2 can be mounted by the flip chip method further steadily on the thick substrate 1 by means of a plurality of solder bump electrodes 8, as well as the effect achieved by provision of the balance keeping part 2d.

According to the present invention, the space W is determined by a variable thickness of the fused solder. The space W of the present invention is controlled by determining various amount of solder and various number of solder bump electrodes. Moreover, provision of the balance keeping part 2d ensures easy produce of the integrated circuit device for acceleration detection 100.

Exemplary materials and dimensions of the members for obtaining the space W of 15±5 μm will be shown below.

The semiconductor strain sensor 2 is made of Si monocrystalline substrate, having a length of 8.0 mm, a width of 1.2 mm and a thickness of 250 μm. The metal mask 9 has a thickness d of 50 μm and the opening 9a has a diameter c of 180 μm. The thick substrate print solder 10 and the thick substrate bump electrode 11 each have a diameter b of 130 μm. The bump solder 13 has a diameter a of 100 μm. Fifteen solder bump electrodes 8 are provided.

Thus, vibration of the balance keeping part 2d, and that of the acceleration sensing part 2a and the mass holding part 2b in the respective natural modes which are different from one another shrink the range of frequency applied to the piezoresistance layer. Since the stress is absorbed around the solder bump electrodes 8, an effect of breaking the stress is achieved as well as the mechanical damping effect.

Moreover, since provision of the balance keeping part 2d eliminates the need for means for holding the semiconductor strain sensor 2 when mounted by the flip chip method in the integrated circuit device for acceleration detection 100, further simplification of manufacturing process and further reduction in manufacturing cost are achieved. Furthermore, the mounting method of the present invention allows reduction in variation of the space W between the thick substrate 1 and the mass holding part 2b.

While the invention has been shown and described in detail, the foregoing description is in all aspects illustrative and not restrictive. It is therefore understood that numerous modifications and variations can be devised without departing from the scope of the invention.

I claim:

1. An integrated circuit device for acceleration detection, comprising:

a substrate;

at least one supporting pedestal formed on said substrate; and detecting means mounted on said substrate with said supporting pedestal interposed therebetween, for detecting acceleration, said detecting means comprises, a first portion, a second portion adjoining said first portion, a third portion adjoining said second portion and being fixed on said supporting pedestal, and a fourth portion adjoining said third portion and counterbalancing said first portion and said second portion, wherein said second portion is thinner than said first, third and fourth portions.

2. The integrated circuit device for acceleration detection of claim 1, wherein said substrate is made of $Al_2O_3$.

3. The integrated circuit device for acceleration detection of claim 1, wherein said at least one supporting pedestal is conductive.

4. The integrated circuit device for acceleration detection of claim 1, wherein said at least one supporting pedestal includes solder.

5. The integrated circuit device for acceleration detection of claim 3, wherein said at least one supporting pedestal includes solder.

6. The integrated circuit device for acceleration detection of claim 4, wherein a space between said substrate and said first portion of said detecting means depends upon the amount of said solder and the number of said supporting pedestals.

7. The integrated circuit device for acceleration detection of claim 5, wherein a space between said substrate and said first portion of said detecting means depends upon the amount of said solder and the number of said supporting pedestals.

\* \* \* \* \*